United States Patent [19]
Bauer et al.

[11] Patent Number: 5,855,162
[45] Date of Patent: Jan. 5, 1999

[54] COFFEE MACHINE

[75] Inventors: Ewald Bauer, Franzosenweg; Reinhard Boos, Georg Burkhardtstrasse; Gert Riethmüller, Brunnenstrasse, all of Germany

[73] Assignee: WMF Wuertembergische Metallwarenfabrik AG, Geislingen/Steige, Germany

[21] Appl. No.: 876,134

[22] Filed: Jun. 23, 1997

[30] Foreign Application Priority Data

Jul. 22, 1996 [EP] European Pat. Off. ......... 96 111 797.5

[51] Int. Cl.[6] ........................................... A47J 31/42
[52] U.S. Cl. ................... 99/290; 99/293; 222/566
[58] Field of Search .............................. 99/290, 293, 304, 99/286; 222/566, 567, 568, 569, 572

[56] References Cited

U.S. PATENT DOCUMENTS 5,473,972  12/1995  Rizzuto et al. ............................ 99/290
5,549,036   8/1996  Hourizadeh ............................ 99/290 X Primary Examiner—Reginald L. Alexander
Attorney, Agent, or Firm—Seed and Berry LLP

[57] ABSTRACT

There is described a coffee machine comprising a coffee outlet (9) and a milk outlet (10), which machine is of simple construction, can be cleaned easily and is improved with respect to operability and functional performance. To this end the present invention suggests that the coffee outlet (9) should be constructionally combined with the milk outlet (10) to obtain an outlet unit (8).

14 Claims, 4 Drawing Sheets

COFFEE MACHINE

TECHNICAL FIELD

The present invention relates to a coffee machine.

BACKGROUND OF THE INVENTION

A coffee machine of such a type is, for instance, known from EP-A-480 928. The known machine is designed as an espresso machine with integrated milk foaming device for making cappuccino, but is also capable of dispensing hot milk. The prior-art machine comprises a coffee outlet and a milk outlet from which coffee and milk froth can be dispensed into the same receptacle at the same time. The coffee outlet is arranged at the side of the coffee machine which faces a user, and the milk outlet is disposed therebehind and is thus not directly visible to the user. The two outlets are designed such that they are fully separated constructionally and are each accommodated individually with their individual components in the coffee machine. As a consequence, they must also be removed individually from the coffee machine and reinstalled, which makes cleaning more difficult and also means enhanced constructional efforts. Moreover, the distance between and the arrangement of the two outlets make it more difficult to position a cup.

Furthermore, a coffee machine with a dual coffee outlet and a dual milk outlet is available on the market. The coffee outlets of the dual outlet are arranged so closely side by side that either a single large cup or two closely adjacent cups can be filled. The milk outlet is arranged in the same manner. In this machine, the dual coffee outlet is disposed at the rear and the dual milk outlet at the front, when viewed by a user. In this case, however, the two dual outlets are also designed and installed such that they are fully separated from each other constructionally. Moreover, the milk froth is divided by a roof prism into the individual outlets in the case of the known dual milk outlet. However, it has been found that the milk froth cannot be divided exactly into two portions of the same size, so that there is the risk that a smaller amount of milk froth will exit from the one or the other individual outlet. Moreover, when the known coffee machine is used with the two dual outlets, increased attention must be paid to the placing of the cups, since a slight displacement of the cups from their correct filling position might have the effect that part of the beverage will miss its mark altogether or will flow down from the cup edge on the exterior of the cup.

Furthermore, US-A-2 827 845 shows a coffee machine comprising a coffee outlet and a milk outlet which are arranged closely side by side, but are designed as part of a mixing valve.

SUMMARY OF THE INVENTION

It is therefore the object of the present invention to simplify a coffee machine of the above-described type constructionally and to improve the machine with respect to its function, operability and cleaning possibilities.

This object is achieved with the characterizing features of an embodiment of the present invention.

As a result of the inventive design, coffee outlet and milk outlet can be cleaned jointly and arranged so closely next to one another that no increased caution must be exercised when the cups are being positioned. The necessary connections are simplified, so that the number of the coffee machine parts to be mounted can be reduced. Thanks to a coaxial arrangement a user knows exactly where he should put down his cup.

From a functional point of view, the design according to one embodiment of the invention wherein the external arrangement of the milk outlet around the coffee outlet has turned out to be a very expedient design, since in such a case the milk froth is distributed over the coffee surface particularly well.

In one embodiment webs on the milk outlet act as guide blades which brake the rotary movement (twist) of the milk and thus prevent or reduce splashing.

Thanks to the design according to an exemplary embodiment the machine can be cleaned more easily, since the port of the coffee outlet which is positioned at a lower level prevents the outlet from being clogged up by milk residues.

An inclined terminating opening for the milk outlet according to an embodiment has the effect that foamed milk, in particular, will drip down at an exactly localizable place of the milk outlet, so that the correct position of the cups can be localized in an improved manner for the user.

The constructional design is even further simplified in cases where according to an emulsifying chamber, which is required for foaming the milk, is integrated into the outlet unit. The design according to one embodiment wherein the coffee outlet extends axially through the emulsifying chamber effects, on the one hand, a compact design of the outlet unit; on the other hand, the emulsifying chamber becomes annular thereby so that froth can be discharged in an improved manner.

The design according to another embodiment of the invention exhibits special advantages as to a compact and constructionally simple structure, good cleaning possibilities and easy operation when two milk outlets and two coffee outlets are combined in the outlet unit.

As regards these dual outlets, it is also expedient to integrate the emulsifying chamber into the outlet unit, with two emulsifying chambers being, however, provided, one for each milk outlet, and connected to a joint mixing means. This has the effect that the milk can be separated much more exactly into two volume units of equal size than would be possible if the finished and foamed milk froth were separated.

The separating operation is expediently performed by the distributor in the form of a prism.

The construction of the outlet unit becomes even more compact and is further improved when a coffee distributing chamber which passes coffee into the two coffee outlets is also integrated into the outlet unit and is arranged above the emulsifying chambers.

Thanks to its compact, constructional design, the outlet unit can be removed as a whole for cleaning purposes, so that the cumbersome unscrewing of individual, small parts, as is required in the prior art, is no longer necessary, with the parts being most of the time not even accessible in an easy manner.

An ejecting means that is provided in another embodiment further facilitates a disassembly for cleaning purposes.

BRIEF DESCRIPTION OF THE DRAWINGS

An embodiment of the present invention shall now be described in detail with reference to drawings, in which.

DETAILED DESCRIPTION OF THE INVENTION

Figure 1:
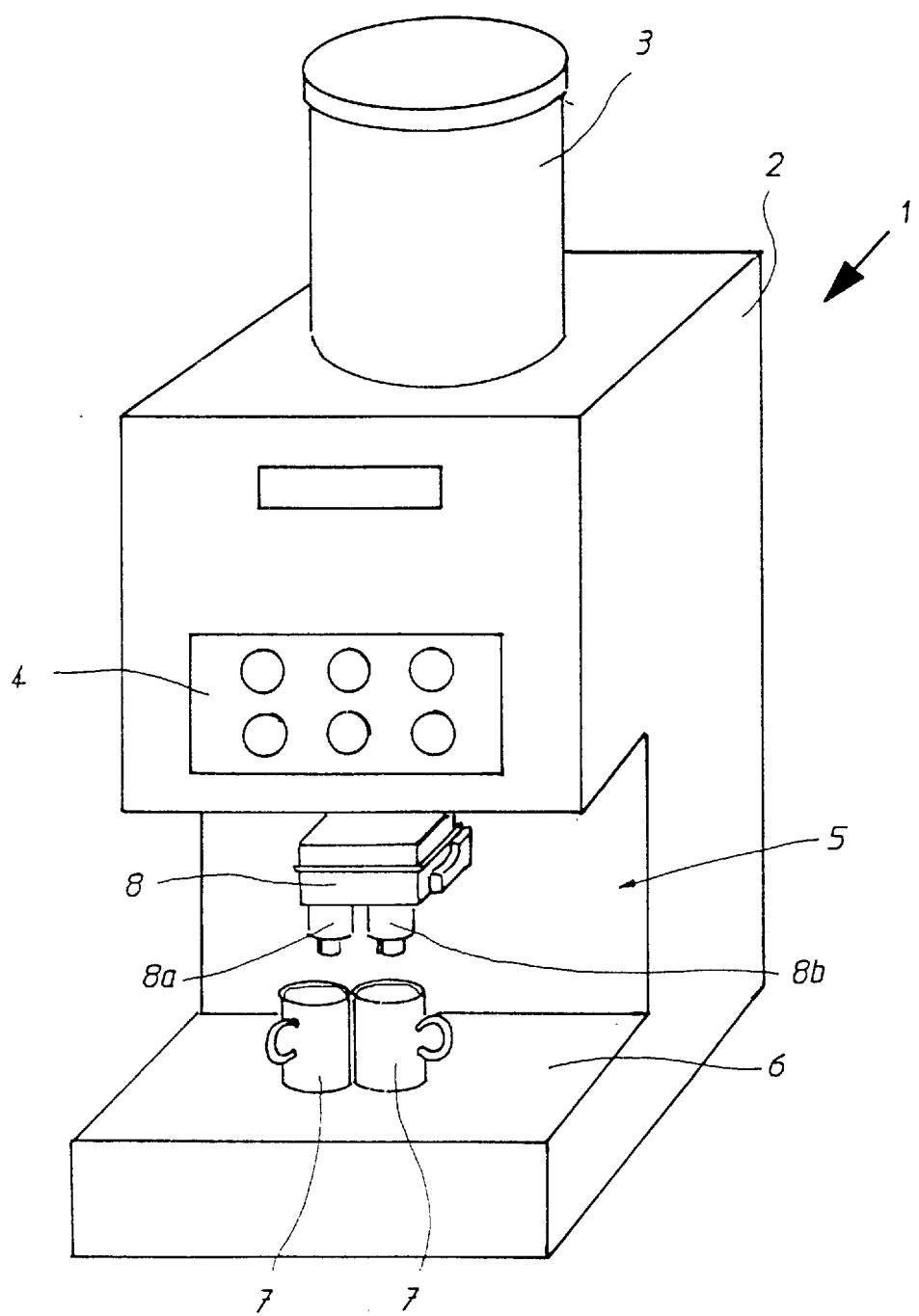
FIG. 1 is a schematic view of a coffee machine equipped in accordance with the present invention.

FIG. 1 is a diagrammatic view showing a coffee machine 1 with a milk foaming means for making cappuccino. The coffee machine 1 comprises a housing 2 with a coffee container 3 put on top thereof, a control panel 4 and a receded outlet compartment 5 with a support surface 6 for at least two cups 7. A compact outlet unit 8 which comprises a first outlet 8a and a second outlet 8b is provided above cups 7. The two outlets 8a, 8b are spaced apart from each other at a predetermined distance which, on the one hand, is great enough that the two cups drawn in FIG. 1 can easily be put thereunder and can be filled jointly, i.e., one cup from one respective outlet. On the other hand, the distance between the two outlets 8a and 8b should be smaller than the diameter of a standard coffee cup, so that a single cup can also be filled from the two outlets jointly.

Figure 2:
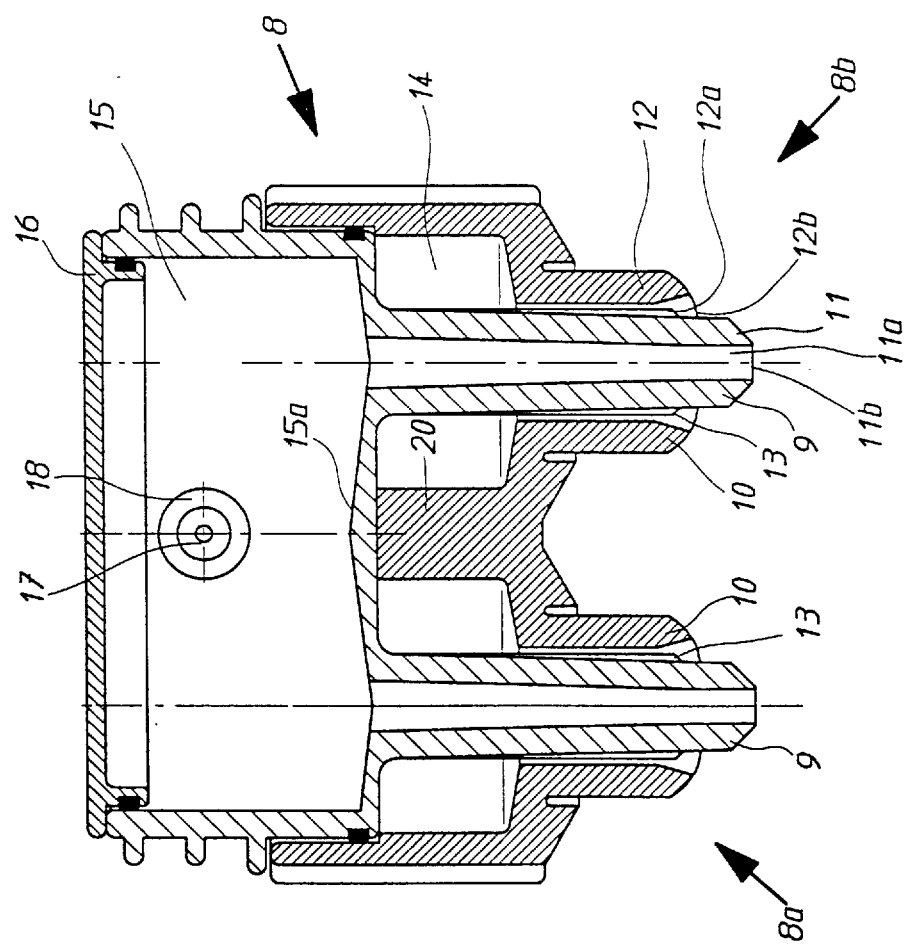
FIG. 2 is a front view of an outlet unit of the coffee machine of the invention according to FIG. 1 in longitudinal section.
Figure 3:
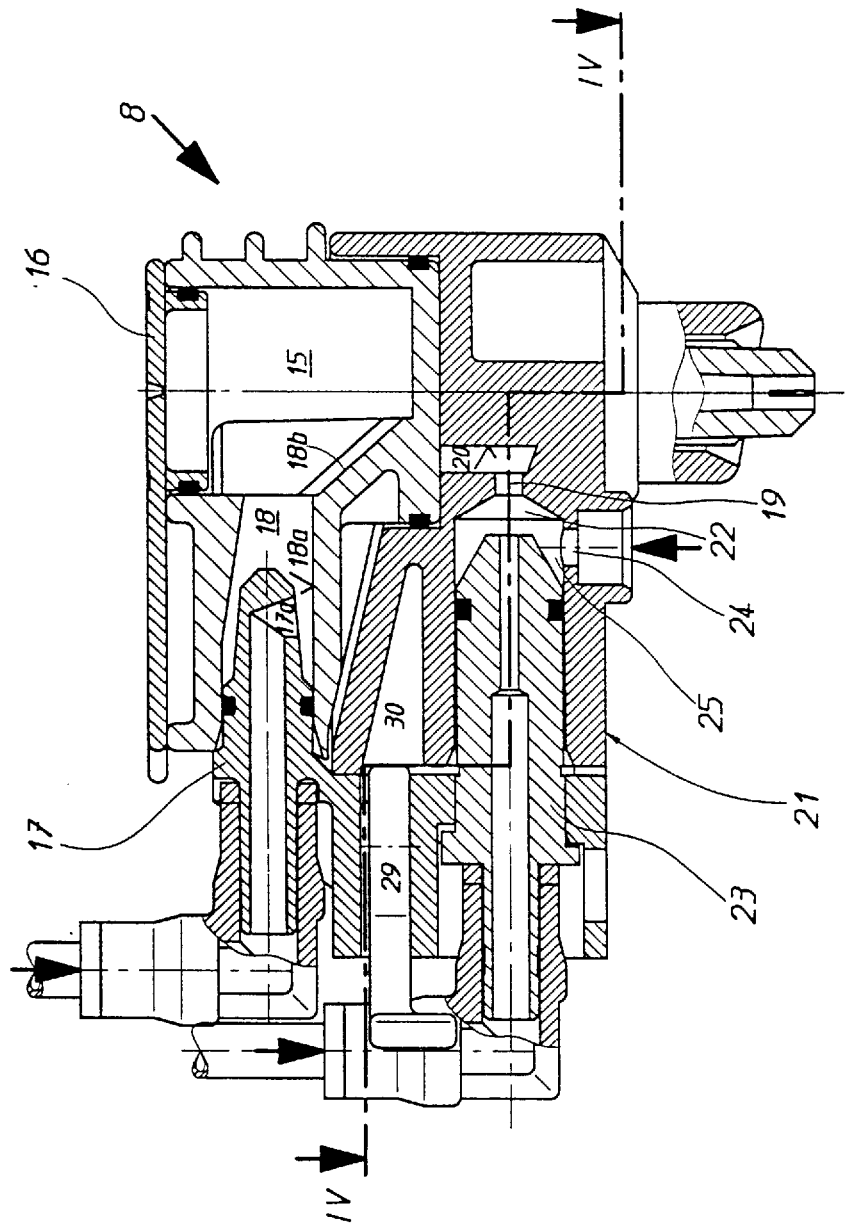
FIG. 3 is a side view of the outlet unit in longitudinal section.
Figure 4:
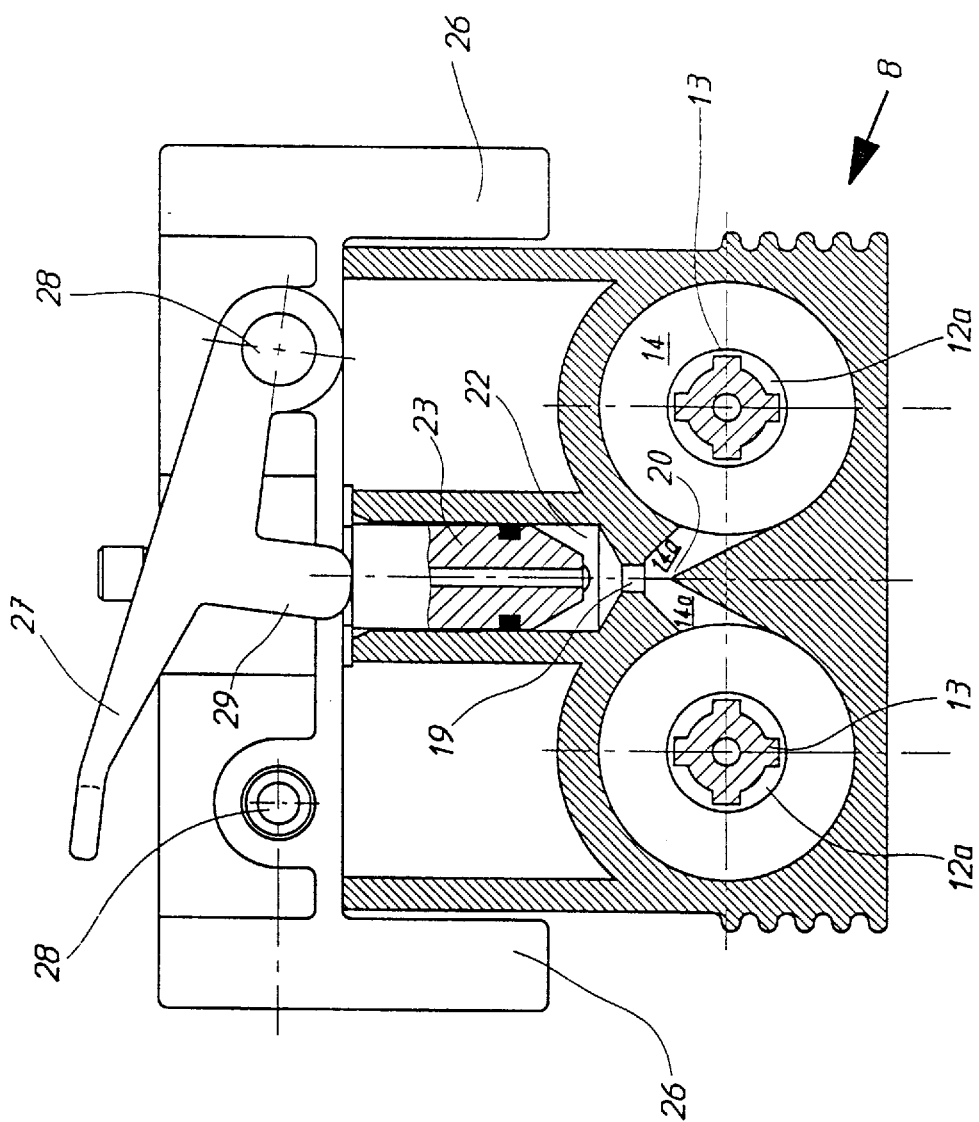
FIG. 4 shows section IV—IV of FIG. 3.

As shown in FIGS. 2 to 4, each outlet 8a, 8b of the outlet unit 8 identically contains a coffee outlet 9 and a milk outlet 10 through which coffee and milk or milk froth can respectively be dispensed at the same time. Coffee outlet 9 contains a pipe with a central passage channel 11a and a port 11b which is located in a horizontal plane in the position of the coffee machine drawn in FIG. 1.

Each milk outlet 10 is also provided with a pipe 12 having a central passage channel 12a and a spout 12b which, as shown in FIG. 2, is obliquely inclined rearwardly upwards relative to port 11b of the coffee outlet 9 in such a manner that the front edge of pipe 12 which faces a user is positioned at a lower level than the rear edge which is oriented away. Such an arrangement complies with the user's wishes, since a user tends to put down the cups rather at the front than to push them fully to the rear.

Pipe 11 of each coffee outlet 9 extends coaxially inside pipe 12 of the respectively assigned milk outlet 10, but has an outer diameter which is smaller than the inner diameter of pipe 12 of the milk outlet, so that an annular passage channel 12 for milk is formed over the whole length of pipe 12 between the two pipes 11, 12. In compliance with an acceptable travel time, the width of the passage channel 12a should be as small as possible to produce a particularly fine-pored and thus durable milk froth. The inner diameter of pipe 12 is preferably 13 mm and the outer diameter of pipe 11 is preferably 11.5 mm. As can particularly be seen in FIGS. 2 and 4, circumferentially distributed webs which are arranged on pipe 11 and which serve as guide blades and ensure that the flow of milk in the annular channel 12a is substantially in axial direction (which will reduce the tendency towards splashing), extend into said annular passage channel 12a. In the illustrated embodiment four webs 13 of a rectangular cross-section are provided per oulet; number and design can, however, be varied.

As is also shown in FIG. 2, pipe 11 of coffee outlet 9 tapers both with its outer surface and with its inner surface towards port 11b, so that on the one hand the coffee jet is concentrated and on the other hand the annular passage channel 12a expands downwards, as the inner surface of pipe 12 extends cylindrically or also slightly conically. At the same time, the radial height of webs 13 is increased. Shortly before port 12b the inner diameter of pipe 12, which is per se cylindrical, also increases slightly conically outwardly.

Above pipe 12 of each outlet 8a and 8b, there is provided a respective emulsifying chamber 14 of identical size, which is enclosed by a circular outer wall, has a diameter which is considerably greater than that of the annular passage channel 12a and opens downwards in said channel. Pipe 11 extends through each emulsifying chamber upwards where a coffee distributing chamber 15 is arranged. The coffee distributing chamber 15 has an oblong, oval shape, extends over both emulsifying chambers 14 and communicates with the passage channels 11a of pipes 11 of the two outlets 8a and 8b. The coffee distributing chamber 15 is closed by a lid 16 from above. A coffee inlet line 17, which is shown in FIG. 3, terminates in the coffee distributing chamber 15 centrally between the two coffee outlets 9. The bottom 15a below the coffee inlet line 17 and between the two passage channels 11a of the coffee outlets 9 is slightly raised and slightly slopes towards the passage channels 11a, which slope facilitates the introduction of coffee into the passage channels 11a. As becomes particularly apparent from FIG. 3, the coffee inlet line 17 has a downwardly oriented port 17a which is first directed towards wall 18a of a pre-chamber 18 which is followed by a ramp 18b extending obliquely downwards towards bottom 15a. As a result, coffee flows in a smoothed flow into the coffee distributing chamber 15 and can be distributed from said chamber in uniform volume flows over the passage channels 11a of the two outlets 8a, 8b.

As can especially be seen in FIGS. 3 and 4, each of the emulsifying chambers 14 is connected to a joint inlet opening 19 via a tangentially terminating channel 14a. The channels 14a of the two emulsifying chambers meet each other shortly before the inlet opening 19, so that the tip of a prism 20, which is designed as a distributor, is axially aligned relative to the inlet opening 19 and is opposite thereto at some distance, the tip dividing the flow entering through inlet opening 19 into two flows of substantially equal volume and tangentially guiding said flows into the annular inner chamber of the respectively adjacent emulsifying chambers.

The inlet opening 19 is connected to a mixing means 21 shared by the two emulsifying chambers 14 for mixing milk, air and steam. The mixing means 21 comprises a mixing chamber 22 adjacent to the inlet opening, as well as an injection nozzle 23 for a steam/air mixture the nozzle opening of which is however coaxially arranged at a distance defined by the mixing chamber 22 relative to the inlet opening 19. Furthermore, a milk inlet 24 opens into mixing chamber 22 and is aligned in a direction perpendicular to the nozzle opening of the injection nozzle 23 so that milk, as is common with these types of machines, is sucked into the mixing chamber 22 due to a Venturi effect. In the illustrated embodiment, the Venturi effect is achieved by actively blowing air into the injection nozzle 23 by means of a pump (not shown) or by means of another source of pressure, the air having already been mixed with steam during its travel, so that an air/steam mixture passes through the nozzle opening of the injection nozzle 23 into the mixing chamber 22 and mixes there with the entrained air. Such a mixing means is, for instance, known from DE-A-44 45 436, the disclosure of which is herewith comprised by way of reference. However, other suitable mixing means could also be used.

As becomes particularly apparent from FIGS. 2 and 3, the coffee distributing chamber 15 is integrally made from plastics together with the two pipes 11 of the coffee outlet, the bottom 15a thereof, ramp 18b and pre-chamber 18 with wall 18a. As can also be seen, the two emulsifying chambers 14 together with their pipes 12, the distributor prism 20, the inlet opening 19 and a receiving hole 25, which contains the mixing chamber 22 and the milk inlet opening 24 and is used for receiving the injection nozzle 23, are also integrally made from a plastic material. These two members are assembled to form an outlet unit 8 in that the coffee distributing chambers are inserted into a space above the emulsifying chambers 14 such that the bottom 15a is seated on the distributor prism 20, which simultaneosuly serves as a spacer. The distributor prism 20 is dimensioned such that the emulsifying chamber 14 has an adequate size, and the ports 11b of pipes 11 project downwards by a predetermined distance from ports 12b of pipes 12. This distance is from 3 to 6 mm, preferably about 5 mm, so that the milk exiting from the annular passage channel 12b will not clog up the coffee outlet port 11b.

Furthermore, the through-hole 25 and the pre-chamber 18 are designed such that, being sealed by standard seals, they can be slid in a detachable press fit over the injection nozzle 23 and the coffee inlet line 17 and can be removed from said members, respectively, and can be held by said members at the right place, so that the oulet unit 8 can be removed as a whole from the corresponding connection lines after removal of the milk connection and can be slid onto said lines, which facilitates cleaning very much.

To facilitate the ejection of the outlet unit 8, there is provided an ejector lever 27 which is formed as a one-sided lever and pivotably supported about a guide rod 28 on the housing 2 of coffee machine 1. The ejector lever 27 comprises a presser rod 29 with the aid of which it can press onto a guide means 30 arranged on the rear side of outlet unit 8. Hence, the outlet unit 8 can easily be withdrawn forwardly by pressing the ejector lever 27.

Furthermore, the outlet unit 8 is vertically adjustable, so that the distance between ports 11b and 12b and the cup 7 put thereunder can be varied. To this end, the outlet unit 8 is movable along two vertically extending and parallel guide rods 28 in vertical direction, either by hand with the aid of handles 26 or by a suitable drive, such as a pinion and a threaded rod.

The coffee machine 1 of the invention can be operated in all functions that are standard with such machines. In cases where onyl black coffee or espresso is to be dispensed, the milk supply means is not operated, so that coffee will be the only outflowing liquid. Furthermore, the coffeee machine can also be used for dispensing hot milk which has not been foamed, provided that use is made of a correspondingly constructed mixing means in which milk is just sucked through hot steam and thereby heated up.

In a modification of the above-described and illustrated embodiment, the single coffee outlet of a coffee machine can also be combined with the single milk outlet thereof to form the above-described outlet unit; in such a case the coffee distributing chamber can optionally be dispensed with and the tangential channel of the emulsifying chamber is solely connected via the inlet port to the mixing chamber of the mixing means. As has already been mentioned, the mixing means may be selected among the known constructions for the coffee machine of the invention. The separation of the milk mixture prior to foaming in the emulsifying chamber is also expedient for other coffee machines with a dual outlet. Other coffee machines may also be provided with a detachable and/or vertically adjustable outlet unit.

We claim:

1. A coffee machine comprising an integrated milk foaming device, a coffee outlet and a milk outlet, said coffee outlet being coaxially aligned with said milk outlet, said milk and coffee outlets are constructionally combined to form an outlet unit.

2. The coffee machine according to claim 1 wherein said milk outlet surrounds said coffee outlet.

3. The coffee machine according to claim 2 wherein axially extending webs are provided in said milk outlet.

4. The coffee machine according to any one of claims 1 to 3 wherein said coffee outlet terminates below said milk outlet.

5. The coffee machine according to claim 1 wherein said milk outlet comprises a terminating opening extending in a direction inclined to the vertical.

6. The coffee machine according to claim 1 wherein said outlet unit contains an emulsifying chamber which is used for foaming milk and is connected to a mixing means for mixing air, steam and milk.

7. The coffee machine according to claim 1 wherein said coffee outlet extended axially through said emulsifying chamber.

8. The coffee machine according to claim 1 wherein said outlet unit respectively contains a first and second milk outlet and a first and second coffee outlet.

9. The coffee machine according to claim 8 wherein said outlet unit contains a first and second emulsifying chamber, said first and second emulsifying chambers being connected to a joint mixing means.

10. The coffee machine according to claim 9 wherein said mixing means is connected via a distributor that is a prism, to said first and second emulsifying chambers.

11. The coffee machine according to claim 8 wherein said outlet unit comprises a coffee distributing chamber which communicates with both of said first and second coffee outlets.

12. The coffee machine according to claim 11 wherein said outlet unit contains first and second emulsifying chambers connected to a mixing means, and said coffee distributing chamber is arranged above said emulsifying chambers.

13. The coffee machine according to claim 1 wherein said outlet unit is arranged on a housing of said coffee machine to be removable in one block.

14. The coffee machine according to claim 13, further comprising an ejector device coupled to the outlet unit for ejecting said outlet unit.

* * * * *